Figure 1:
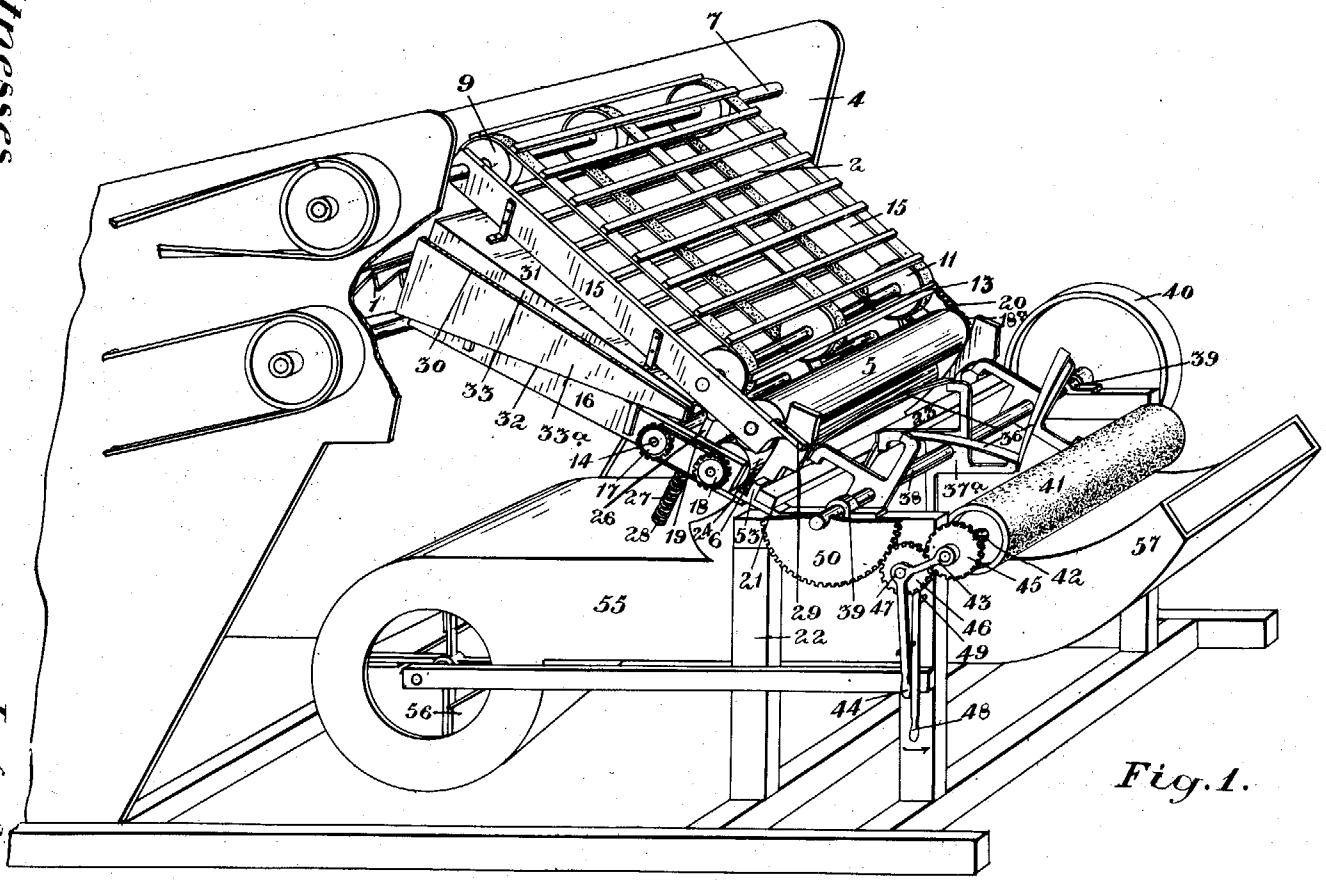

No. 12,534. REISSUED SEPT. 25, 1906.

D. A. & J. F. STEWART.

STRAW CUTTER.

APPLICATION FILED MAR. 22, 1905.

5 SHEETS—SHEET 1.

Witnesses.
H. C. Trimble
C. B. Sheffield

Inventors.
David A. Stewart
John F. Stewart
by Chas. H. Riches
their Attorney

No. 12,534. REISSUED SEPT. 25, 1906.
D. A. & J. F. STEWART.
STRAW CUTTER.
APPLICATION FILED MAR. 22, 1905.
5 SHEETS—SHEET 2.
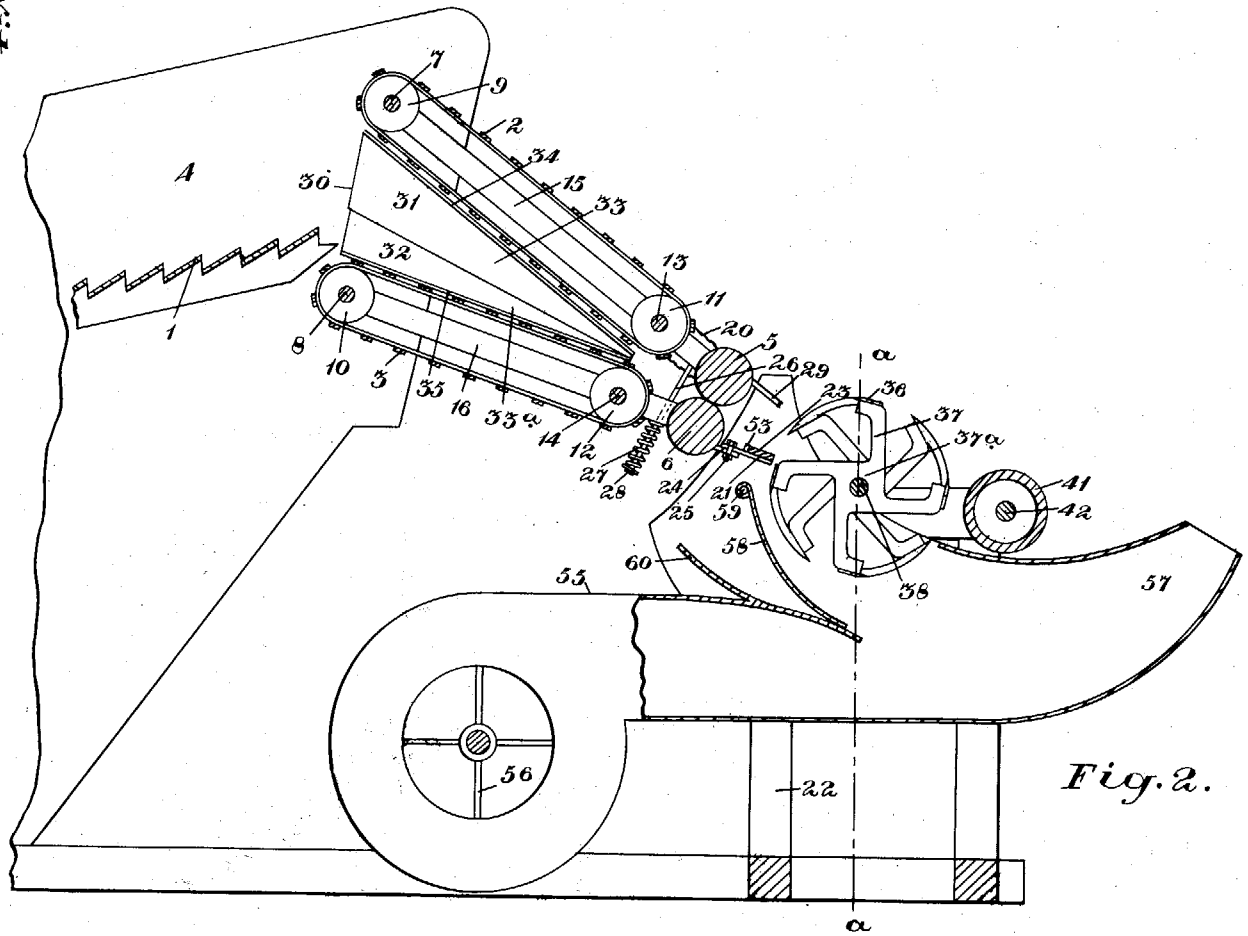
Witnesses.
H. L. Trimble
C. B. Sheffield
Inventors.
David A. Stewart
John F. Stewart
by Chas. H. Riches
their Attorney No. 12,534. REISSUED SEPT. 25, 1906.

D. A. & J. F. STEWART.

STRAW CUTTER.

APPLICATION FILED MAR. 22, 1905.

5 SHEETS—SHEET 3.

Witnesses.
H. L. Trimble.
C. B. Sheffield

Inventors
David A Stewart
John F. Stewart
by Chas W Rickes
their Attorney

No. 12,534. REISSUED SEPT. 25, 1906.

D. A. & J. F. STEWART.

STRAW CUTTER.

APPLICATION FILED MAR. 22, 1905.

5 SHEETS—SHEET 4.

Witnesses.
H. L. Trimble.
A. B. Sheffield

Inventors.
David A. Stewart
John F. Stewart
by Chas. W. Rieles
their attorney

No. 12,534. REISSUED SEPT. 25, 1906.

D. A. & J. F. STEWART.

STRAW CUTTER.

APPLICATION FILED MAR. 22, 1905.

5 SHEETS—SHEET 5.

Witnesses.

H. L. Trumble.

A. B. Sheffield

Inventors.

David A. Stewart

John F. Stewart by Chas. H. Riches their Attorney

UNITED STATES PATENT OFFICE.

DAVID ALBERT STEWART AND JOHN FERGUSON STEWART, OF MOLESWORTH, ONTARIO, CANADA.

STRAW-CUTTER.

No. 12,534. Specification of Reissued Letters Patent. Reissued Sept. 25, 1906.

Original No. 758,792, dated May 3, 1904. Application for reissue filed March 22, 1905. Serial No. 251,540.

*To all whom it may concern.*

Be it known that we, DAVID ALBERT STEWART and JOHN FERGUSON STEWART, of the village of Molesworth, in the county of Huron and Province of Ontario, Canada, have invented certain new and useful Improvements in Straw-Cutters, of which the following is a full, clear, and exact description.

This invention relates to a combined threshing-machine and straw-cutter in which the straw as it is discharged from the delivery mechanism of the threshing-machine is received by a conveyer and automatically fed toward the cutting mechanism, the straw according to the adjustment of the apparatus being delivered either cut or uncut to the mow or stack.

As the straw should be compressed into a compact mass as it is fed from the threshing-machine to the cutting mechanism, it is advisable to employ two revoluble feed elements having their contiguous surfaces moving in the same direction and preferably converging from the delivery part of the threshing-machine toward the straw-receiving part of the cutting mechanism, so that such elements during their revolution will simultaneously carry the straw toward the cutting mechanism and compress it into what may be termed a "solid" mass and firmly hold it while the cutting-knives are operating against it.

The invention consists in the construction and combination of elements hereinafter described, and particularly pointed out in the claims.

For a full understanding of the invention reference is to be had to the following description, setting forth one means by which the invention may be carried into practice, and to the accompanying drawings, illustrating the same, in which—

Figure 2A:
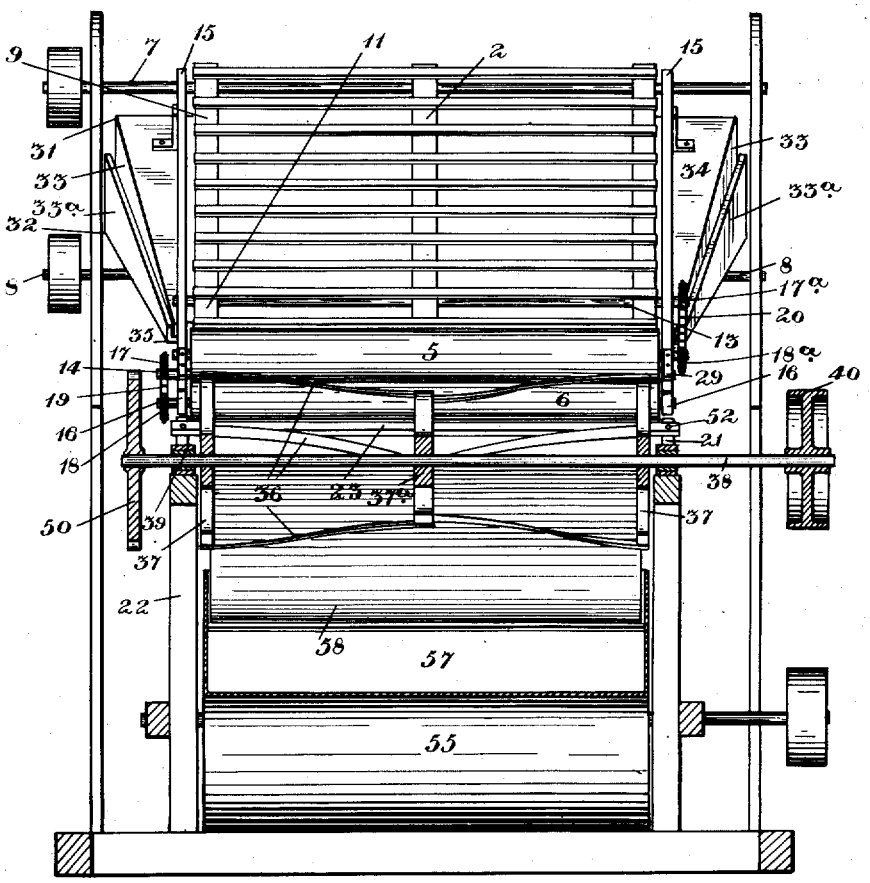
Figure 5:
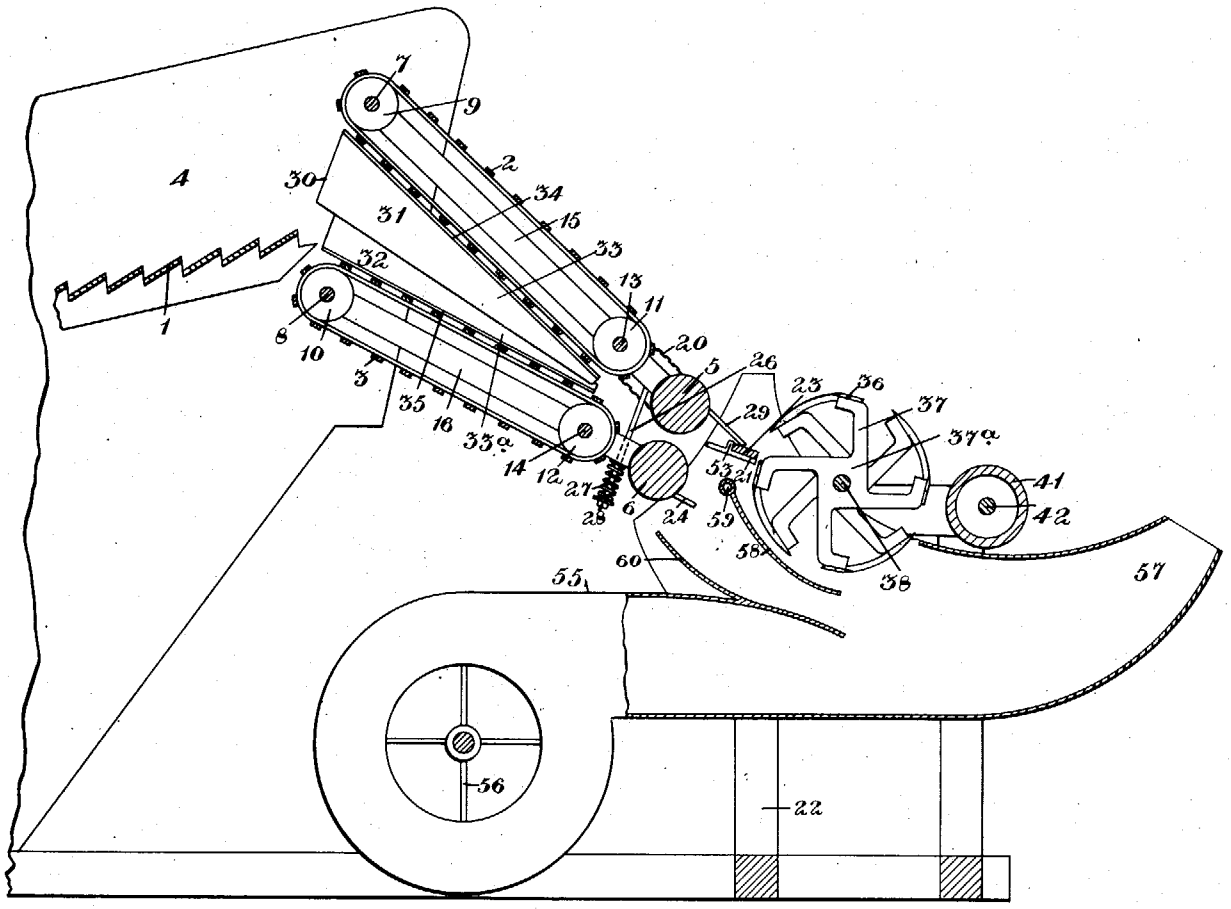
Figure 4:
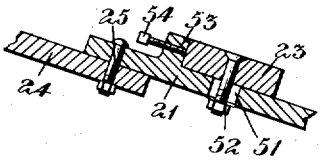
Figure 5:
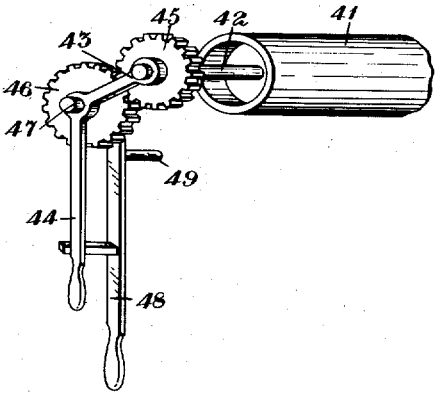
Figure 6:
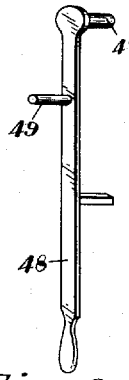
Figure 7:
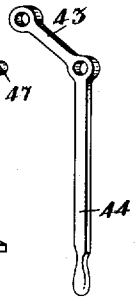
Figure 8:
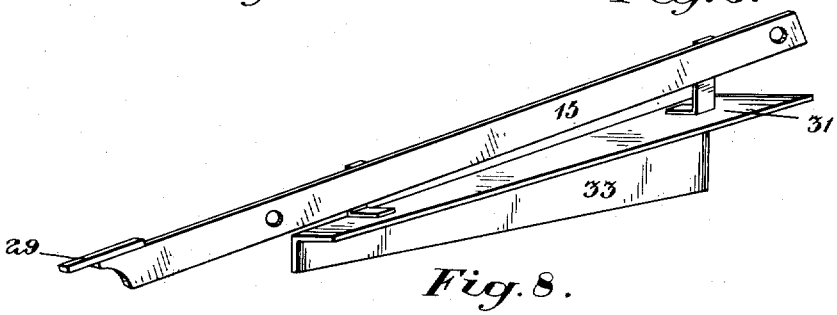

Figure 1 is a perspective view of the cutting and sharpening mechanism, a portion of the threshing-machine, and the feed mechanism for automatically conveying the straw from the threshing-machine to the cutting mechanism and compressing it during its conveyance. Fig. 2 is a longitudinal section through the same with the feed mechanism positioned to deliver the straw to the knives. Fig. 2[a] is a vertical section taken on the line *a a*, Fig. 2. Fig. 3 is a view similar to Fig. 2, showing the feed mechanism positioned to deliver the straw below the knives. Fig. 4 is a transverse sectional view through the stationary knife and the knife-support. Fig. 5 is a perspective view of the adjusting and driving means of the sharpening mechanism. Figs. 6 and 7 are detail views of the same, and Fig. 8 is a perspective view of one of the straw-guards.

Like numerals of reference refer to like parts throughout the specification and drawings.

The straw is discharged from the straw-deck 1 into the throat between the revoluble feed-belts 2 and 3, located at the delivery end 4 of the threshing-machine and having their contiguous surfaces movable in the same direction and converging toward the cutting mechanism. To effect the revolution of the feed-belts, two suitably-driven shafts 7 and 8 are journaled in the sides of the threshing-machine, the shaft 8 being preferably located in rear of the straw-deck and below the plane of its top surface and the shaft 7 above it at a sufficient height to allow the straw to enter the throat-opening between the two shafts. Mounted upon the shafts 7 and 8 are pulleys 9 and 10, respectively, around which are revoluble the feed-belts 2 and 3, the feed-belts being also revoluble around the pulleys 11 and 12, mounted upon shafts 13 and 14, journaled in the side bars 15 and 16, projecting rearwardly from the delivery end of the threshing-machine.

As shown in the drawings, the side bars 15 and 16 are supported from the shafts 7 and 8, and the free ends of these side bars converge to effect the convergence of the feed-belts 2 and 3, and journaled in the side bars 15 and 16 between the pulleys 11 and 12 and the cutting mechanism are compression-rollers 5 and 6. Mounted upon the end of the shaft 14 is a sprocket-wheel 17, and mounted upon the shaft of the compression-roller 6 is a similar sprocket-wheel 18, and revoluble around the sprocket-wheels 17 and 18 is a sprocket-chain 19, by which motion is transmitted from the pulley-shaft 14 to the compression-roller 6, the compression-roller 5 being similarly driven from the pulley-shaft 13 by a sprocket-chain 20, revoluble around similar sprocket-wheels 17[a] and 18[a], mounted upon the pulley-shaft 13 and the shaft of the compression-roller 5, respectively.

When it is desired to cut the straw, the feed-belts and compression-rollers are positioned, as shown in Figs. 1 and 2 of the drawings, with the lower side bars 16 temporarily secured to the stationary-knife supports 21, which form part of or are rigidly connected to the main frame 22 of the straw-cutter, so that the opening between the two compression-rollers may be maintained at a higher elevation than the plane of the top surface of the stationary knife 23, mounted on the stationary-knife supports 21. Each of the lower side bars 16 has a projecting plate 24 extending beneath the stationary-knife support 21, and passing through the plate 24 and the stationary-knife support 21 are fastening-bolts 25, by which the plates 24 are detachably fastened to the stationary-knife support to maintain the side bars in their adjusted position. To compensate for any variation in the depth of the quantity of straw passing between the feed-belts, it is advisable to permit the upper feed-belt and compression-roller to automatically adjust themselves to the lower feed-belt and lower compression-roller when in the position illustrated in Fig. 2, and this adjustment is effected by allowing the upper side bars 15 to swing from their points of attachment, which are shown in this case to be from the shaft 7, and carry with them the upper feed-belt and upper compression-roller. To maintain the requisite tension or pressure of the upper feed-belt and compression-roller against the straw, movable guide-rods 26 are connected to the upper side bars and movable through corresponding apertures in the lower side bars 16, and these guide-rods are fitted with tension-springs 27, bearing against the lower edges of the side bars 16, and nuts or other holding means 28 on the guide-rods below the side bars.

The straw being delivered from the straw-deck 1 into the throat between the feed-belts 2 and 3, as above described, is carried toward the compression-rollers, which grasp and feed it toward the cutting mechanism. As the straw when it leaves the deck of the threshing-machine is in a loose and bulky condition, it is advisable to have the throat-opening between the feed-belts where the straw is delivered to it of such dimensions as will correspond with the capacity of the threshing-machine, and it is necessary to so arrange the feed-belts that they will compress the straw into a compact body before delivering it to the compression-rolls, by which it is further compressed before delivering it to the cutting mechanism, so that the cutting mechanism may properly perform the function of cutting it, and for that reason the belts are arranged to converge toward the cutting mechanism, and to compensate for any increase above the normal depth of the straw when compressed the feed-belts are each permitted to adjust themselves one to the other, as hereinbefore and hereinafter described, without, however, decreasing the pressure of the belts against the straw. While the feed-belts are positioned to deliver the straw to the cutting mechanism, they are maintained as shown in Figs. 1 and 2; but should it be necessary to deliver the straw uncut the plate 24 is detached from the stationary-knife support 21, so that the side bars 15 and 16 may move into the position shown in Fig. 3, where they are held by the projecting stops 29, attached to the upper side bars 15, coming into contact with the top surfaces of the knife-support 21, the stops 29 being so arranged upon the side bars 15 that they will when in contact with the knife-support 21 position the compression-rollers to deliver the straw below the stationary knife, from where it is delivered to the mow, stack, or ground. When the feed-belts and compression-rollers are in the position shown in Fig. 3, the whole weight of their free ends is sustained by the stops 29, resting upon the knife-support 21, and when the depth of the straw between the feed-belts is sufficient to require their separation the lower feed-belt and lower compression-rollers are pressed away from the upper feed-belt and upper compression-roller, the tension-springs 27 yielding sufficiently to permit of such movement.

To direct the straw into the throat between the feed-belts, the apparatus is fitted with straw-guards 30, each consisting of two guard-sections 31 and 32, having overlapping side plates 33 and 33ª and inturned flanges 34 and 35, respectively, arranged parallel with the adjacent surfaces of the feed-belts 2 and 3. The upper guard-sections 31 are attached to the upper side bars 15, and the lower guard, sections 32 are attached to the lower side bars 16, with the flanges 34 and 35 projecting, respectively, within the side edges of the feed-belts 2 and 3 to prevent the straw escaping from between them as it is fed to the cutting mechanism, the ends of the side plates 33 and 33ª contiguous to the straw-deck fitting tightly against the sides of the threshing-machine, so that the straw cannot pass from the threshing-machine except into and through the space between the feed-belts. By making the straw-guard in two sections and attaching one of them to the upper feed-belt side bars and the other to the lower feed-belt side bars it is possible for the straw-guard sections to move in conjunction with the feed-belts as they adjust themselves relatively to each other.

Revolving past the stationary knife 23 are the rotary knives 36, attached to the knife-arms 37, the hubs 37ª of which are mounted upon and revoluble with a shaft 38, journaled in bearings 39, connected to the main frame 22. The shaft 38 is provided with a drive-pulley 40, to which motion is transmitted from any suitable source for the purpose of revolving it and the rotary knives at a high rate of speed. As the continuous use of the apparatus will dull the edges of the rotary knives 36, it is necessary to employ a sharpening attachment which can be moved into and out of engagement with the knives 36 during their revolution to sharpen their edges. This sharpening attachment consists of an emery-wheel 41, having its shaft 42 journaled in the arms 43 of the adjusting-levers 44, hereinafter described. Mounted on one end of the shaft 42 is a gear-wheel 45, meshing with a corresponding gear-wheel 46, revoluble upon a stud 47, projecting from the side face of an adjusting-lever 48, fulcrumed to the main frame 22 by means of the fulcrum-pin 49. When it is desired to rotate the emery-wheel 41, the lever 48 is turned upon its fulcrum 49 in the direction indicated by arrow in Fig. 1 of the drawings to move the gear-wheel 46 into mesh with the gear-wheel 50, mounted to revolve with the knife-shaft 38, and by moving the adjusting-levers 44 in the same direction the emery-wheel is caused to engage the rotary knives. To maintain the longitudinal axis of the emery-wheel shaft 42 concentric with the axis of the gear-wheel 46, the stud 47 is projected beyond the side face of the gear-wheel 46, and fulcrumed upon that stud 47 and upon a corresponding stud projecting from the opposite side of the frame and alining with it are the adjusting-levers 44.

To compensate for the wear of the rotary knives 36, it is advisable to provide for the lateral adjustment of the stationary knife 23, and this adjustment is effected by forming in the stationary-knife support 21 slots 51, through which extend the adjusting-bolts 52, holding the stationary knife to the support, and to accurately adjust the stationary knife to the rotary knives the stationary-knife support is fitted with upwardly-projecting lugs 53 opposite the adjacent side face of the stationary knife 23, and passing through the lugs 53 are set-screws 54 to move the stationary knife toward the rotary knives.

As the straw passes over the stationary knife it is cut by the rotary knives 36 and drops into the blower 55 to be carried by the air-current from the blower-fan 56 through the pipe 57 to its place of delivery. To direct the course of the cut straw from the rotary knives into the blower, a deflecting-plate 58 is suspended from a hinge-rod 59, supported from any convenient part of the apparatus, and such deflecting-plate 58 is so located within the blower-casing that the air-pressure and straw within it can only find relief by passing through the blower-pipe 57. The blower-casing is provided with a flange 60 in rear of the deflecting-plate 58 to direct the uncut straw into the blower as it is delivered from the feeding mechanism when the feed-belts are in the position shown in Fig. 3, the pressure of the uncut straw against the deflecting-plate 58 raising it so that it can pass into the blower. By means of the hinged deflecting-plate 58 the cut straw is directed into the blower after passing the cutting-point, and the uncut straw is permitted to enter the blower without any of the parts of the apparatus other than changing the position of the delivery end of the feed-belts having to be manually altered.

Having thus fully described our invention, what we claim as new, and desire to secure by Letters Patent, is—

1. The combination of threshing mechanism, cutting mechanism, and feed mechanism interposed between the threshing and cutting mechanism comprising a shaft located above the deck of the threshing mechanism and in rear of the same, a pair of arms mounted in said shaft, a second shaft journaled in the arms, pulleys mounted on both shafts and belts carried by the pulleys, a third shaft located below the deck of the threshing-machine and in rear of the same opposite to the first-mentioned shaft, a pair of arms mounted on the third shaft, a fourth shaft journaled in the arms opposite to the second-mentioned shaft, pulleys mounted on both shafts and belts carried by the pulleys, the belts all having their contiguous surfaces moving in the same direction.

2. The combination of threshing mechanism, cutting mechanism, and feed mechanism interposed between the threshing and cutting mechanism comprising a shaft located above the deck of the threshing mechanism and in rear of the same, a pair of arms mounted in said shaft, a second shaft journaled in the arms, pulleys mounted on both shafts and belts carried by the pulleys, a third shaft located below the deck of the threshing-machine and in rear of the same opposite to the first-mentioned shaft, a pair of arms mounted on the third shaft, a fourth shaft journaled in the arms opposite to the second-mentioned shaft, pulleys mounted on both shafts and belts carried by the pulleys, the belts all having their contiguous surfaces moving in the same direction, and straw-guards for the feed mechanism each consisting of two guard-sections connected respectively to the upper and lower arms to move in conjunction therewith.

3. The combination of threshing mechanism, cutting mechanism, and feed mechanism interposed between the threshing and cutting mechanism comprising a shaft located above the deck of the threshing mechanism and in rear of the same, a pair of arms mounted on said shaft, a second shaft journaled in the arms, pulleys mounted in both shafts and belts carried by the pulleys, a third shaft located below the deck of the threshing-machine and in rear of the same opposite to the first-mentioned shaft, a pair of arms mounted on the third shaft, a fourth shaft journaled in the arms opposite to the second-mentioned shaft, pulleys mounted on both shafts and belts carried by the pulleys, the pulleys all having the contiguous surfaces moving in the same direction, one of said belts with its arms being automatically adjustable with reference to the other belt, and tension means connected to each pair of arms to cause the belts to maintain constant pressure upon the straw between them.

4. The combination of threshing mechanism, cutting mechanism, and feed mechanism interposed between the threshing and cutting mechanism comprising a shaft located above the deck of the threshing mechanism and in rear of the same, a pair of arms mounted on said shaft, a second shaft journaled in the arms, pulleys mounted in both shafts and belts carried by the pulleys, a third shaft located below the deck of the threshing-machine and in rear of the same opposite to the first-mentioned shaft, a pair of arms mounted on the third shaft, a fourth shaft journaled in the arms opposite to the second-mentioned shaft, pulleys mounted on both shafts and belts carried by the pulleys, the pulleys all having the contiguous surfaces moving in the same direction, one of said belts with its arms being automatically adjustable with reference to the other belt, and tension means connected to each pair of arms to cause the belts to maintain constant pressure upon the straw between them, and straw-guards for the feed mechanism each consisting of two sections connected respectively to each pair of arms and moving in conjunction therewith.

5. The combination with the straw-deck of a threshing-machine the straw-cutting attachment comprising the knife-wheel and knife-bar, and the endless bands and discharge-rollers forming a conveying means from the straw-deck to the knife-wheel, of the blower having the spout thereof extending underneath the knife-wheel and a swinging deflecting-plate hinged in proximity to said rollers for directing the straw into the blast from the blower located in front of the knife-wheel beneath the knife-bar.

6. In combination in a straw-cutter, cutting means a pair of endless aprons for delivering the straw to the cutters, supports for said aprons, means for adjusting the supports with the aprons thereon in relation to the cutting means whereby the straw may be directed to the cutting means or aside therefrom, whereby the straw may either be cut or delivered uncut at will and yielding means for holding the supports together at their ends adjacent to the cutting means.

7. In combination, in a straw-cutter, cutting means, a pair of endless aprons for delivering the straw to the cutters, supports for said aprons, means for adjusting the supports with the aprons thereon in relation to the cutting means whereby the straw may be directed to the cutting means or aside therefrom, whereby the straw may either be cut or delivered uncut at will and yielding means for holding the supports together at their ends adjacent to the cutting means, said yielding means comprising a spring carried by the supports so that the said spring will be effective in all positions of the aprons in relation to the cutting means.

8. In a straw-cutter, the combination with cutting means, of a pair of belts, means for causing their contiguous surfaces to move in the same direction, and means whereby said pair of feed-belts may be adjusted either to direct the straw to the cutter, or aside therefrom; whereby the straw may be either cut or delivered uncut.

9. In a straw-cutter, the combination with cutting means of a pair of belts, means for causing their contiguous surfaces to move in the same direction, means whereby said pair of feed-belts may be adjusted either to direct the straw to the cutter or aside therefrom; whereby the straw may be either cut or delivered uncut, bars supporting the feed-belts and a connection between the bars consisting of a rod and a spiral spring on the said rod, said rod being secured to one of the bars and extending beyond the other bar with the spring on the extended end of the rod, said spring serving to draw the two bars together.

Molesworth, February 23, A. D. 1905.

DAVID ALBERT STEWART.
JOHN FERGUSON STEWART.

In presence of—
MABEL BROWN,
J. W. CARTHERD.